US012587472B2

(12) United States Patent
Hornsberger et al.

(10) Patent No.:  US 12,587,472 B2
(45) Date of Patent:  Mar. 24, 2026

(54) NEIGHBOR ROUTER IDENTIFICATION FOR MULTICAST RSVP FAST REROUTE

(71) Applicant: Arista Networks, Inc., Santa Clara, CA (US)

(72) Inventors: Jeffrey Christopher Hornsberger, Vancouver (CA); Damien Raphaël Léo Fleurisson, Paris (FR); Quintin Alexander Smith, Burnaby (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 119 days.

(21) Appl. No.: 18/765,580

(22) Filed: Jul. 8, 2024

(65) Prior Publication Data

US 2026/0012415 A1    Jan. 8, 2026

(51) Int. Cl.
H04L 45/50         (2022.01)
H04L 43/0811       (2022.01)
H04L 45/00         (2022.01)

(52) U.S. Cl.
CPC .......... H04L 45/50 (2013.01); H04L 43/0811 (2013.01); H04L 45/22 (2013.01)

(58) Field of Classification Search
CPC ....... H04L 45/50; H04L 43/0811; H04L 45/22
See application file for complete search history.

(56) References Cited

U.S. PATENT DOCUMENTS

| | | | | |
|---|---|---|---|---|
| 9,350,650 B2 * | 5/2016 | Ye | .......................... | H04L 45/507 |
| 2006/0159009 A1 * | 7/2006 | Kim | ........................ | H04L 45/16 |
| | | | | 370/242 |
| 2011/0063972 A1 * | 3/2011 | Muley | ..................... | H04L 45/16 |
| | | | | 370/252 |
| 2014/0064062 A1 * | 3/2014 | Taillon | .................... | H04L 45/28 |
| | | | | 370/392 |
| 2023/0388245 A1 * | 11/2023 | Fleurisson | .......... | H04L 12/4633 |

* cited by examiner

*Primary Examiner* — Jerry B Dennison
(74) *Attorney, Agent, or Firm* — Fountainhead Law Group, PC

(57)                ABSTRACT

Techniques for performing neighbor router identification in the context of multicast RSVP fast reroute. In one set of embodiments, these techniques enable a Merge Point (MP) to correctly identify a Point of Local Repair (PLR) that transmitted a backup RSVP Path message in the scenario where the MP has multiple upstream neighbor routers. In another set of embodiments, these techniques enable a PLR to correctly identify an MP that transmitted a backup RSVP Resv message in the scenario where the PLR has multiple downstream neighbor routers.

20 Claims, 11 Drawing Sheets

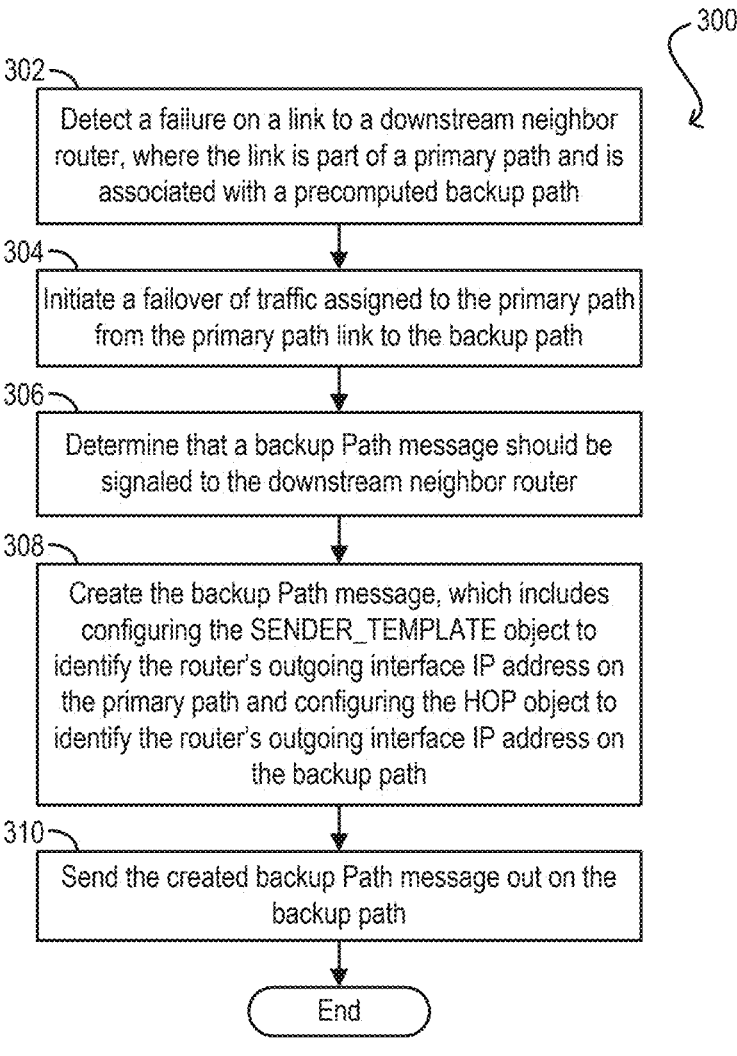

_300_

302 —
| Detect a failure on a link to a downstream neighbor router, where the link is part of a primary path and is associated with a precomputed backup path |

304 —
| Initiate a failover of traffic assigned to the primary path from the primary path link to the backup path |

306 —
| Determine that a backup Path message should be signaled to the downstream neighbor router |

308 —
| Create the backup Path message, which includes configuring the SENDER_TEMPLATE object to identify the router's outgoing interface IP address on the primary path and configuring the HOP object to identify the router's outgoing interface IP address on the backup path |

310 —
| Send the created backup Path message out on the backup path |

( End )

*FIG. 3*

NEIGHBOR ROUTER IDENTIFICATION FOR MULTICAST RSVP FAST REROUTE

BACKGROUND

Multiprotocol Label Switching (MPLS) is a networking technology that uses labels, rather than Internet Protocol (IP) addresses, to route network traffic (packets). When a packet is received at an ingress router of an MPLS network (i.e., a network composed of MPLS-enabled routers), the ingress router assigns the packet to a preconfigured unidirectional path through the network, known as a label switched path or LSP, and adds an MPLS header to the packet that includes a label associated with the LSP. The labeled packet is then forwarded along the LSP (i.e., from next hop to next hop) until it reaches an egress router of the MPLS network. At the egress router, the MPLS header is removed from the packet and the packet is forwarded to its destination based on Layer 3 information (e.g., the packet's destination IP address).

Resource Reservation Protocol (RSVP) is a protocol that enables signaling (or in other words, establishment) of LSPs in an MPLS network in a manner that supports traffic engineering. For example, RSVP can reserve network bandwidth and other resources for a flow of packets (i.e., data flow) that is intended to use an LSP at the time of LSP establishment, thereby ensuring that the LSP is able to meet quality of service (QOS) requirements specified for the data flow.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 depicts a workflow for identifying a Point of Local Repair (PLR) that transmitted a backup RSVP Path message according to certain embodiments of the present disclosure.

DETAILED DESCRIPTION

Figure 1A:
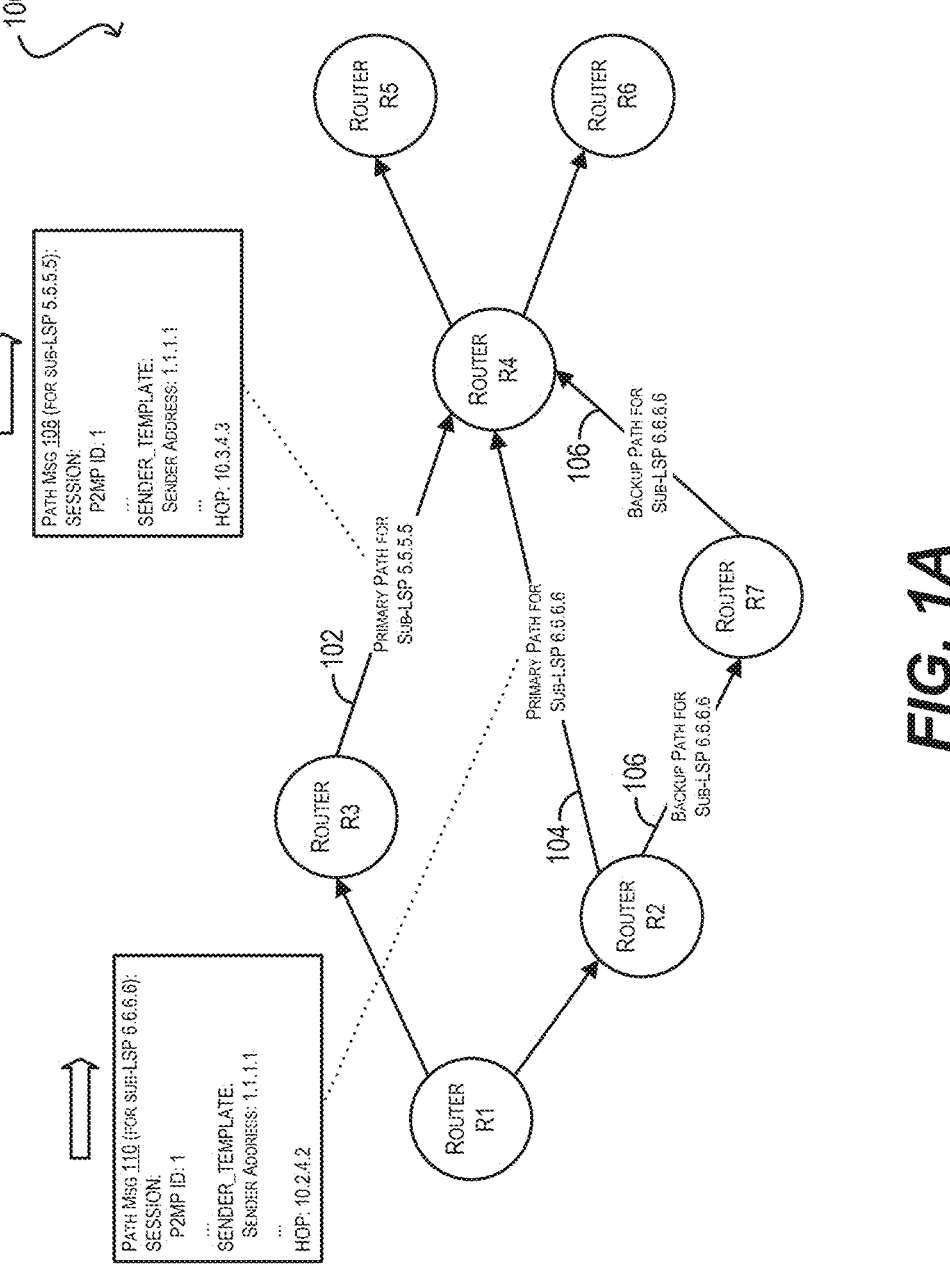
FIGS. 1A and 1B depict scenarios involving an example MPLS network according to certain embodiments of the present disclosure.

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

The present disclosure is directed to techniques for performing neighbor router identification in the context of multicast RSVP fast reroute (FRR). The sections below provide a brief overview of RSVP, multicast RSVP, and FRR. This is followed by an explanation of two problems pertaining to neighbor router identification that are encountered in this setting and solutions to these problems in accordance with the techniques of the present disclosure.

1. RSVP

As mentioned in the Background section, RSVP is a protocol that enables the signaling/establishment of a unidirectional path (e.g., an LSP) for a data flow in a network (e.g., an MPLS network). This path is defined by a sequence of routers and network links that the data flow will traverse to reach its destination. As part of the signaling process, the routers along the path can reserve resources (e.g., bandwidth and buffer space) for the data flow, which allows for resource optimization and enforcement of QOS requirements/policies.

RSVP generally works as follows for signaling an LSP P in an MPLS network for a data flow F:

1. A sender (ingress router) computes a path to a receiver (egress router) that meets certain network constraints imposed by data flow F. These constraints may pertain to bandwidth, latency, hop count, and/or other metrics.

2. The ingress router transmits an RSVP Path message in the forward (downstream) direction towards the egress router over the computed path, which corresponds to LSP P. This Path message, which is received and forwarded by each router present along the downstream route, includes among other things a SESSION object that identifies the RSVP session for data flow F/LSP P, traffic characteristic information for data flow F, a SENDER_TEMPLATE object that (typically) includes the IP address of the ingress router, and a HOP object that includes the interface IP address of the previous hop (i.e., upstream neighbor router).

3. Upon receiving the Path message, each router processes the message by recording the information contained therein in a path state entry for LSP P. In addition, each router allocates an MPLS label for LSP P and stores this label in a local table.

4. Once the Path message reaches the egress router, the egress router transmits an RSVP Reservation (Resv) message in the reverse (upstream) direction back towards the ingress router. This Resv message, which is received and forwarded by each router present along the upstream route, includes among other things a SESSION object that identifies the RSVP session, a resource reservation request for data flow F, a FILTER_SPEC object that mirrors the SENDER_TEMPLATE object included in the received Path message, and a HOP object that includes the interface IP address of the previous hop (i.e., downstream neighbor router).

5. Upon receiving the Resv message, each router processes the message by reserving the resources requested therein for data flow F and associating the resource reservation with the path state entry created at (3). Once the ingress router receives and processes the Resv message, LSP P is considered fully established and data packets can be forwarded along the LSP.

6. Both the Path and Resv messages are periodically resent in order to maintain the path state entries and their associated resource reservations. If a router does not receive a Path or Resv message for a path state entry within a timeout period, it will delete the entry and thereby release the resources reserved for data flow F/LSP P.

During the signaling process above, each router R in LSP P is identified with respect to its neighbor routers by the outgoing interface IP address that it uses to reach those neighbors (where a "neighbor router" is a router that is adjacent to R and exchanges RSVP signaling messages with R). This means that each router R is not globally identified and is often known by a different identifier (interface IP address) to each of its neighbor routers due to being connected through different interfaces. For example, consider a scenario in which a router R1 is connected to an upstream neighbor router R2 through an interface 10.1.2.1 of R1 and to a downstream neighbor router R3 through an interface 10.1.3.1 of R1. In this scenario, router R2 will only know/identify router R1 via the address 10.1.2.1 and router R3 will only know/identify router R1 via the address 10.1.3.1. This is significant for reasons that are explained below.

2. Multicast RSVP and FRR

RSVP can be used to signal paths for both unicast data flows (i.e., data flows from a single sender to a single receiver) and multicast data flows (i.e., data flows from a single sender to multiple receivers). The latter capability is referred to as multicast RSVP. In MPLS networks, it is possible for multicast RSVP to signal multiple sub-LSPs within a single signaling sub-group (or in other words, using the same Path/Resv messages), where each sub-LSP corresponds to a different destination (or receiver). In this scenario, the path through the MPLS network is a tree with multiple endpoints (known as a point-to-multipoint (P2MP) LSP) starting at the ingress router and ending at a set of egress routers. A given router in the tree may have multiple upstream and/or downstream neighbor routers because it may be reached in different ways for different sub-LSPs within the P2MP LSP.

In addition, RSVP supports a feature known as fast reroute (FRR) that establishes/precomputes an alternate, backup path between a pair of neighbor routers on a signaled (primary) path. When a failure occurs on the link between the two neighbor routers on the primary path and FRR is enabled, the router that is immediately upstream of the failure (called the Point of Local Repair or PLR) will continue transmitting Path messages to its downstream neighbor router (called the Merge Point or MP) over the backup path. Similarly, the router that is immediately downstream of the failure (i.e., the MP) will continue transmitting Resv messages to its upstream neighbor router (i.e., the PLR) over the backup path (or over another path that leads to the PLR). These Path messages and Resv messages are referred to as backup Path messages and backup Resv messages respectively.

3. Problems with Neighbor Router Identification

There are two problems pertaining to neighbor router identification that arise when multiple sub-LSPs are signaled within the same multicast RSVP signaling sub-group and FRR is used. The first relates to the ability of an MP to correctly identify the PLR that sent a backup Path message in the case where the MP has multiple upstream neighbor routers in the signaling sub-group, and the second relates to the ability of a PLR to correctly identify the MP that sent a backup Resv message in the case where the PLR has multiple downstream neighbor routers in the signaling sub-group. Each of these problems are discussed below.

3.1 Correctly Identifying the PLR that Transmitted a Backup Path Message

As noted previously, when a failure occurs and FRR is enabled, the PLR (i.e., the neighbor router immediately upstream of the failure) sends backup Path messages to the MP (i.e., the neighbor router immediately downstream of the failure) over a precomputed backup path. Conventionally, these backup Path messages are modified in comparison to the original (primary) Path messages sent over the primary path to reflect the backup path taken and to inform the MP of the failure condition. In particular, the PLR changes both the SENDER_TEMPLATE and HOP objects of the backup Path message to include the outgoing interface IP address of the PLR on the backup path (rather than the original outgoing interface IP address of the PLR on the primary path).

The issue with this conventional approach is that, upon receiving the backup Path message, the MP will observe that the SENDER_TEMPLATE object has changed for the existing RSVP session (and thus will deduce that an upstream failure has occurred) but has no idea which of its multiple upstream neighbor routers is the PLR that sent the message. This is because (1) the backup Path message no longer contains any indication of the original outgoing interface IP address of the PLR as included in previous primary Path messages received from that router; instead, it only contains the PLR's new outgoing interface IP address on the backup path; and (2) the MP only knows the PLR by that original outgoing interface IP address (as explained previously). Accordingly, from the MP's perspective the backup Path message could have been sent by any of its upstream neighbor routers, and thus the MP cannot correctly identify the PLR. This in turn means that the MP cannot properly maintain its local path state information for the sub-LSP(s) signaled through the PLR, which can lead to timeouts and traffic disruption.

Figure 1B:
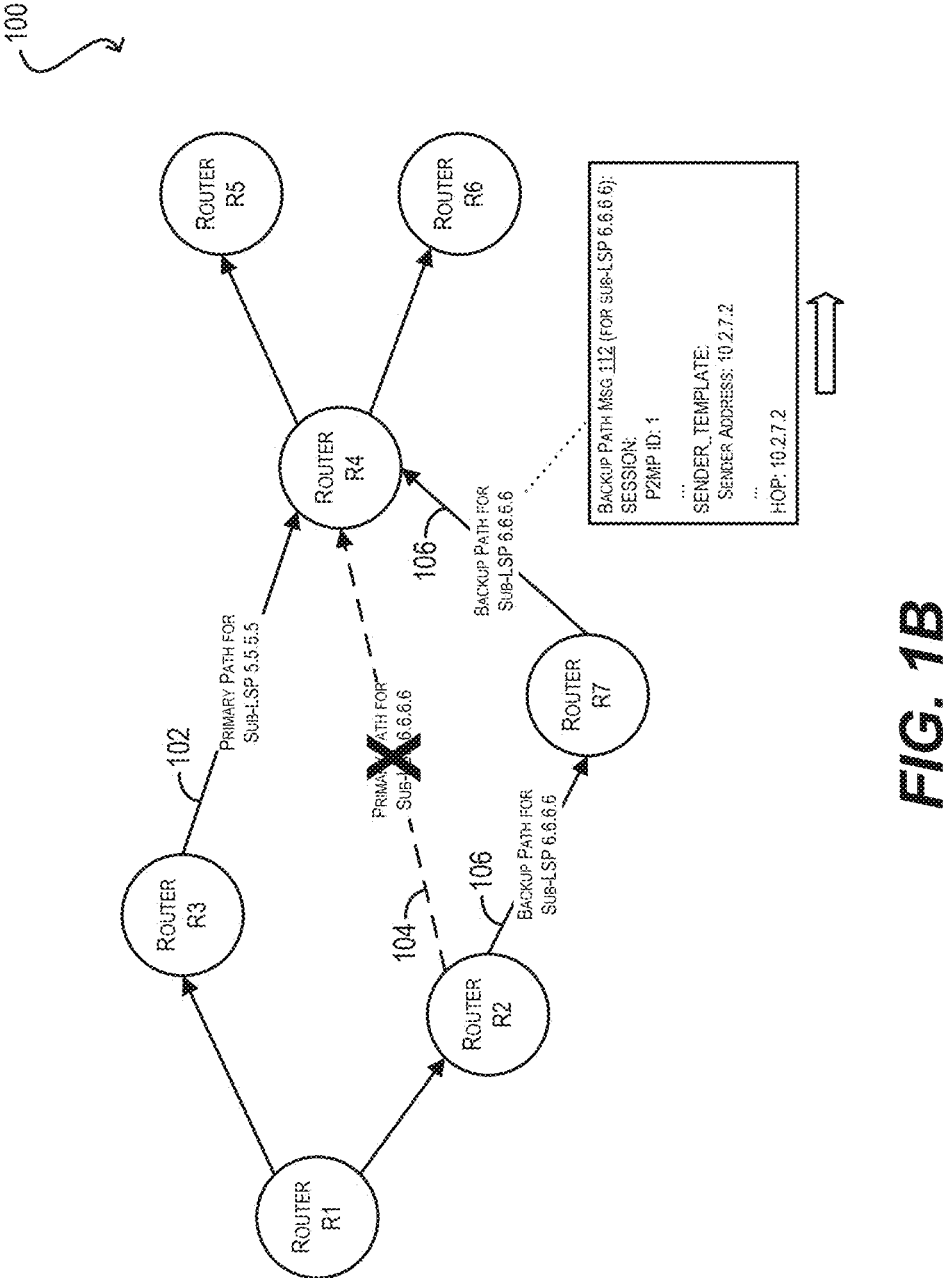

To illustrate the foregoing, FIGS. 1A and 1B depict an example MPLS network 100 comprising six routers R1-R6, where a P2MP LSP 1 has been established via multicast RSVP between ingress router R1 and two egress routers R5 and R6, and where two sub-LSPs are signaled within a single signaling sub-group for P2MP LSP 1—namely, a first sub-LSP leading to egress router R5 and a second sub-LSP leading to egress router R6. In these figures, the loopback IP address (or in other words, router ID) of each router RA is assumed to be A.A.A.A and the interface IP addresses on the link between two neighbor routers RA and RB are assumed to be 10.A.B.A (on the side of RA) and 10.A.B.B (on the side of RB). Accordingly, the sub-LSP leading to router R5 is denoted as "sub-LSP 5.5.5.5" and the sub-LSP leading to router R6 is denoted as "sub-LSP 6.6.6.6". Further, the link between routers R3 and R4 (identified by reference numeral 102) is part of a primary path for sub-LSP 5.5.5.5, the link between routers R2 and R4 (identified by reference numeral 104) is part of a primary path for sub-LSP 6.6.6.6, and the links between routers R2 and R7 and between routers R7 and R4 (identified by reference numeral 106) constitute a backup path for primary path link 104 between R2 and R4. This configuration means that router R4 has two upstream neighbor routers: R3 and R2.

FIG. 1A depicts a state of MPLS network 100 where all of the primary paths are operational. Accordingly, router R3 sends a Path message 108 to router R4 over primary path link 102 for sub-LSP 5.5.5.5 that includes a SESSION object identifying the RSVP session to which P2MP LSP 1 belongs, a SENDER_TEMPLATE object identifying the router ID of ingress router R1 as the sender address, and a HOP object identifying the outgoing interface IP address of router R3 on primary path link 102 (i.e., 10.3.4.3) as the message's previous hop. Similarly, router R2 sends a Path message 110 to router R4 over primary path link 104 for sub-LSP 6.6.6.6 that includes a SESSION object identifying the RSVP session to which P2MP LSP 1 belongs, a SENDER_TEM-PLATE object identifying the router ID of ingress router R1 as the sender address, and a HOP object identifying the outgoing interface IP address of router R2 on primary path link 104 (i.e., 10.2.4.2) as the message's previous hop.

FIG. 1B depicts a state of MPLS network 100 where primary path link 104 for sub-LSP 6.6.6.6 has failed, thereby causing router R2 to failover RSVP signaling for sub-LSP 6.6.6.6 to the backup path embodied by links 106. In this scenario, router R2 is the PLR for the link failure and transmits a backup Path message 112 over the backup path to router R4 (i.e., the MP) that includes the same SESSION object as original Path message 110, a modified SENDER_TEMPLATE object identifying the outgoing interface IP address of R4 on the backup path (i.e., 10.2.7.2) as the sender address, and a modified HOP object identifying the outgoing interface IP address of R4 on the backup path (i.e., 10.2.7.2) as the message's previous hop.

Upon receiving backup Path message 112, router R4 can infer that there was an upstream failure due to the changed SENDER_TEMPLATE object. However, as explained above, router R4 only knows router R2 via interface IP address 10.2.4.2 (i.e., the interface IP address included in the HOP object of Path message 110) and router R3 via interface IP address 10.3.4.3 (i.e., the interface IP address included in the HOP object of Path message 108). Accordingly, router R4 cannot determine which of these two upstream neighbor routers is the PLR that sent backup Path message 112.

One way to avoid this problem is to ensure that only one sub-LSP (path) is signaled per signaling sub-group. In this case, each router will have at most one upstream neighbor in the sub-group, which means that upon receiving a backup Path message an MP can infer that its singular upstream neighbor is the PLR that sent the message. However, this approach is not ideal as it incurs significantly higher signaling overhead in comparison to grouping multiple sub-LSPs into a single signaling sub-group.

3.2 Correctly Identifying the MP that Transmitted a Backup Resv Message

The second problem can be considered an inverse of the first in that, when a PLR has multiple downstream neighbor routers in a signaling sub-group and receives a backup Resv message, the PLR may have difficulties in correctly identifying which downstream neighbor is the MP that transmitted the message. Conventionally, these backup Resv messages are modified in comparison to the original (primary) Resv messages sent over the primary path to (1) include, in the HOP object, the outgoing interface IP address of the MP on the backup path (rather than the original outgoing interface IP address of the MP on the primary path), and (2) mirror, in the FILTER_SPEC object, the contents of the SENDER_TEMPLATE object of the corresponding backup Path message. Because FRR requires that a PLR precompute a backup path to an MP before any failure occurs (which means the PLR knows the outgoing interface IP address of the MP on the backup path), it is possible for the PLR to associate this known address with the MP's outgoing interface IP address on the primary path and, upon receiving a backup Resv message, identify the MP based on the HOP object in the message and the association. However, this approach does not work for all network topologies.

For example, consider a topology in which two neighbor routers are connected to each other via two separate primary path links and one backup path. If both of the primary path links fail, RSVP signaling for the primary paths will failover to the single backup path and the router that is downstream from the failure will act as two logical MPs, each sending backup Resv messages for its respective sub-LSP to the router that is upstream from the failure (i.e., the PLR). But the backup Resv messages received by the PLR will have the same interface IP address in their HOP objects (namely, the outgoing interface IP address of the downstream router on the single backup path), and thus the PLR will not be able to distinguish which backup Resv message came from which logical MP.

Figure 2A:
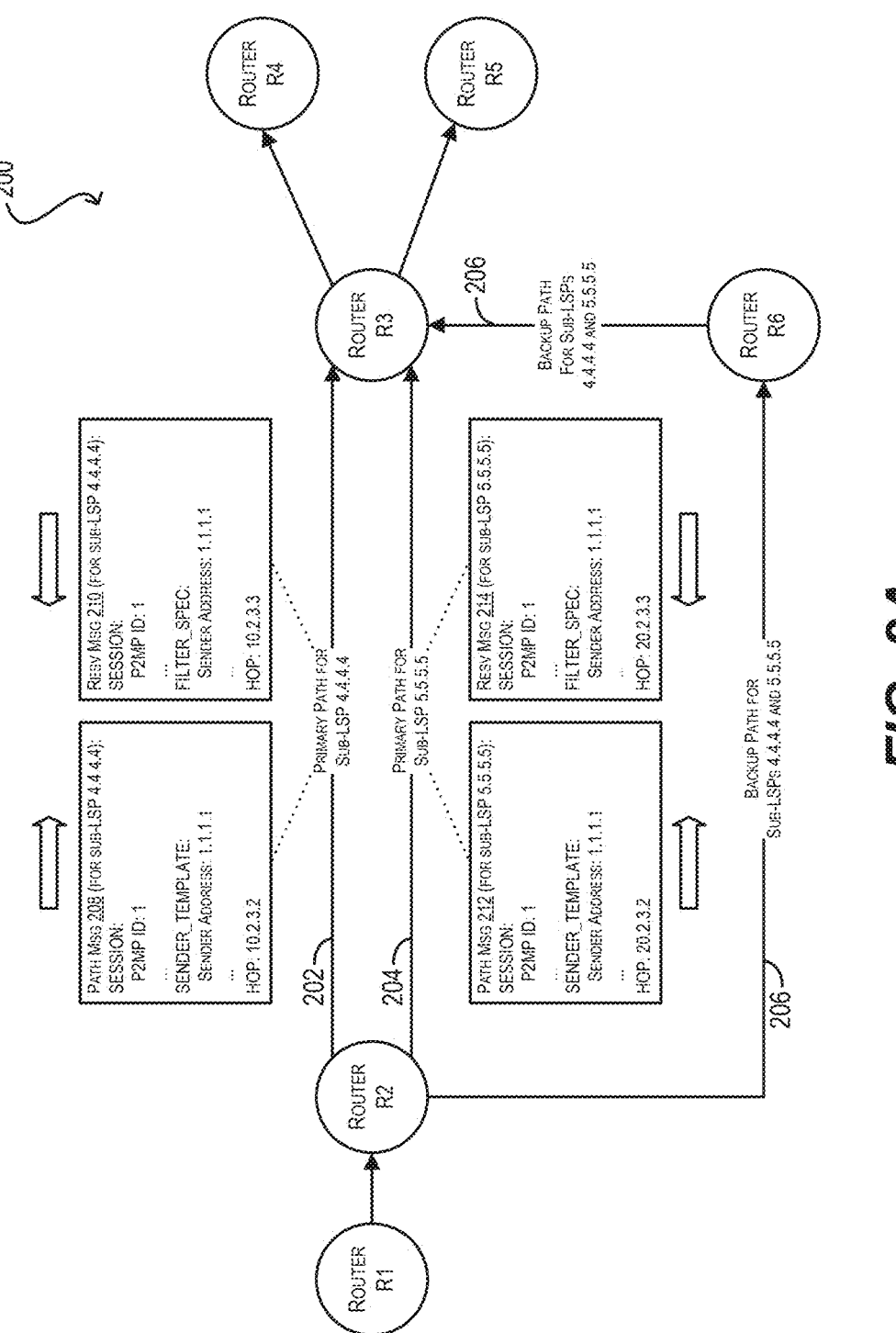
FIGS. 2A and 2B depict scenarios involving another example MPLS network according to certain embodiments of the present disclosure.
Figure 2B:
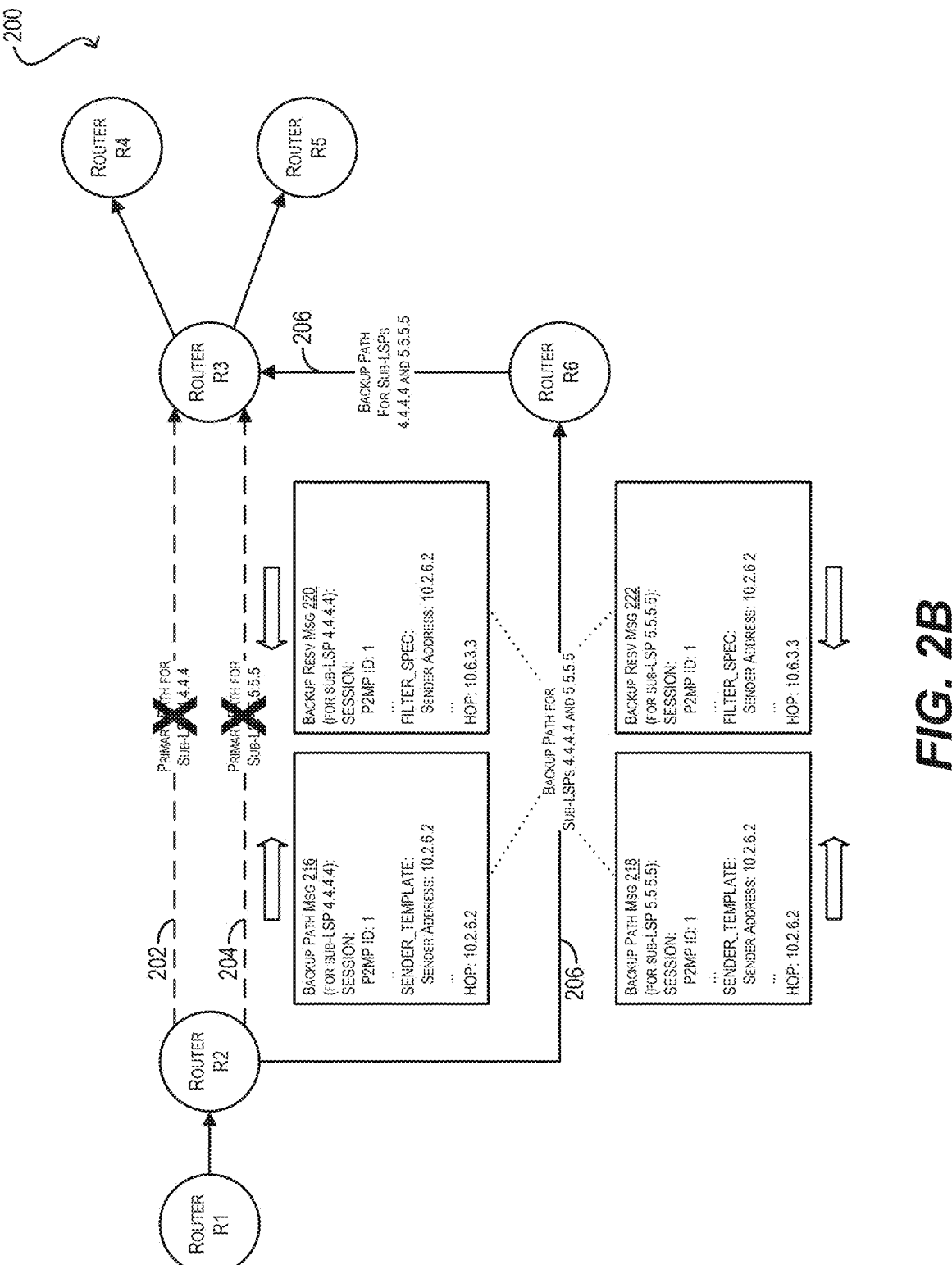

To illustrate the foregoing, FIGS. 2A and 2B depict an example MPLS network 200 comprising six routers R1-R6, where a P2MP LSP 1 has been established via multicast RSVP between ingress router R1 and two egress routers R4 and R5, and where two sub-LSPs are signaled within a single signaling sub-group for P2MP LSP 1—namely, a first sub-LSP leading to egress router R4 (denoted as "sub-LSP 4.4.4.4") and a second sub-LSP leading to egress router R5 (denoted as "sub-LSP 5.5.5.5"). In this example, routers R2 and R3 are coupled to each other via two separate primary path links: a first primary path link 202 that is part of the primary path for sub-LSP 4.4.4.4 (which connects to interface IP address 10.2.3.2 on the side of R2 and interface IP address 10.2.3.3 on the side of R3) and a second primary path link 204 that is part of the primary path for sub-LSP 5.5.5.5 (which connects to interface IP address 20.2.3.2 on the side of R2 and interface IP address 20.2.3.3 on the side of R3). In addition, the links between routers R2 and R6 and between routers R6 and R3 (identified by reference numeral 206) constitute a singular backup path for primary path links 202 and 204. This configuration means that router R2 has two logical downstream neighbor routers, which are embodied by interfaces 10.2.3.3 and 20.2.3.3 of physical router R3.

FIG. 2A depicts a state of MPLS network 200 where all of the primary paths are operational. Accordingly, router R2 sends a Path message 208 to router R3 over primary path link 202 for sub-LSP 4.4.4.4 that includes a SESSION object identifying the RSVP session to which P2MP LSP 1 belongs, a SENDER_TEMPLATE object identifying the router ID of ingress router R1 as the sender address, and a HOP object identifying the outgoing interface IP address of router R2 on primary path link 202 (i.e., 10.2.3.2) as the message's previous hop. In response, router R3 sends a Resv message 210 to router R2 over primary path link 202 that includes a SESSION object identifying the RSVP session to which P2MP LSP 1 belongs, a FILTER_SPEC object mirroring the SENDER_TEMPLATE object of Path message 208, and a HOP object identifying the outgoing interface IP address of router R3 on primary path link 202 (i.e., 10.2.3.3).

Similarly, router R2 sends a Path message 212 to router R3 over primary path link 204 for sub-LSP 5.5.5.5 that includes a SESSION object identifying the RSVP session to which P2MP LSP 1 belongs, a SENDER_TEMPLATE object identifying the router ID of ingress router R1 as the sender, and a HOP object identifying the outgoing interface IP address of router R2 on primary path link 204 (i.e., 20.2.3.2) as the message's previous hop. In response, router R3 sends a Resv message 214 to router R2 over primary path link 204 that includes a SESSION object identifying the RSVP session to which P2MP LSP 1 belongs, a FILTER_SPEC object mirroring the SENDER_TEMPLATE object of Path message 212, and a HOP object identifying the outgoing interface IP address of router R3 on primary path link 204 (i.e., 20.2.3.3).

FIG. 2B depicts a state of MPLS network 200 where both primary path links 202 and 204 between routers R2 and R3 have failed, thereby causing router R2 to failover signaling for sub-LSP 4.4.4.4 and sub-LSP 5.5.5.5 to the singular backup path embodied by links 206. In this scenario, router R2 is the PLR for both link failures and transmits two backup Path messages over the backup path to router R3: a first backup Path message 216 for sub-LSP 4.4.4.4 that includes the same SESSION object as original Path message 208, a modified SENDER_TEMPLATE object identifying the outgoing interface IP address of R2 towards the backup path (i.e., 10.2.6.2) as the sender address, and a modified HOP object identifying the outgoing interface IP address of R2 towards the backup path (i.e., 10.2.6.2) as the message's previous hop; and a second backup Path message 218 for sub-LSP 5.5.5.5 that includes the same SESSION object as original Path message 210, a modified SENDER_TEM-PLATE object identifying the outgoing interface IP address of R2 towards the backup path (i.e., 10.2.6.2) as the sender address, and a modified HOP object identifying the outgoing interface IP address of R2 towards the backup path (i.e., 10.2.6.2) as the message's previous hop.

Further, router R3 transmits two backup Resv messages over the backup path to router R2: a first backup Resv message 220 for sub-LSP 4.4.4.4 that includes the same SESSION object as Resv message 210, a FILTER_SPEC object mirroring the SENDER_TEMPLATE object of backup Path message 216, and a HOP object identifying the outgoing interface IP address of R3 on the backup path (i.e., 10.6.3.3) as the message's previous hop; and a second backup Resv message 222 for sub-LSP 5.5.5.5 that includes the same SESSION object as Resv message 214, a FILTER_SPEC object mirroring the SENDER_TEMPLATE object of backup Path message 218, and a HOP object identifying the outgoing interface IP address of R3 on the backup path (i.e., 10.6.3.3) as the message's previous hop.

Upon receiving backup Resv messages 220 and 222, router R2 needs to determine which logical MP on router R3 sent each message in order to maintain its local reservation state information for sub-LSPs 4.4.4.4 and 5.5.5.5 respectively. However, because the content of the FILTER_SPEC and HOP objects of these two messages are identical, router R2 cannot distinguish between them.

Like the first problem, one way to avoid this second problem is to ensure that only one sub-LSP (path) is signaled per signaling sub-group. In this case, each router will have at most one downstream neighbor in the sub-group, which means that upon receiving a backup Resv message a PLR can infer that its singular downstream neighbor is the MP that sent the message. However, this approach is not ideal as discussed above.

4. Solution to PLR Identification

To solve the problem of correctly identifying the PLR that transmitted a backup Path message, in certain embodiments the PLR can set the SENDER_TEMPLATE object of the backup Path messages it sends over the backup path to include the outgoing interface IP address of the PLR on the primary path (rather than the outgoing interface IP address of the PLR on the backup path). This is the address by which the MP knew the PLR prior to the failure event, and thus the MP can use this information to unambiguously identify the PLR upon receiving backup Path messages.

This solution is compatible with relevant Request for Comments (RFCs) published by Internet Engineering Task Force (IETF) pertaining to RSVP and FRR because those RFCs only require that the SENDER_TEMPLATE object in a backup Path message be changed to some address belonging to the PLR in order to notify the MP of the FRR failover. By changing the SENDER_TEMPLATE object to identify the PLR's outgoing interface IP address on the primary path, the MP is able to identify which of its upstream neighbors detected the failure and can continue its signaling uninterrupted.

FIG. 3 depicts a workflow 300 that may be executed by a network router for implementing the foregoing solution according to certain embodiments. In one set of embodiments workflow 300 may be embodied in software that runs on one or more general-purpose processors of the router, such as an operating system (OS) that runs on a central processing unit (CPU) that is part of the router's management/control plane. In other embodiments workflow 300 may be embodied in hardware, such as an application-specific integrated circuit (ASIC) or field-programmable gate array (FPGA) that is part of the router's data plane.

Starting with step 302, the router can detect a failure that affects a link to a downstream neighbor router, where the link is part of a (primary) path through a network that is signaled using RSVP and is associated with a precomputed backup path. For example, the primary path may be a sub-LSP that is signaled (along with one or more other sub-LSPs) via a multicast RSVP signaling sub-group, and the backup path may be precomputed using FRR.

At step 304, the router (which serves as a PLR for the failure) can initiate a failover of traffic assigned to the primary path from the primary path link to the backup path.

At step 306, the router can determine that a backup RSVP Path message should be signaled to the downstream neighbor router (which serves as an MP for the failure).

In response, the router can create the backup Path message, which includes configuring the SENDER_TEM-PLATE object of the message to identify the router's outgoing interface IP address on the primary path and configuring the HOP object of the message to identify the router's outgoing interface IP address on the backup path (step 308).

Finally, the router can send the backup Path message out on the backup path (step 310) and the workflow can end.

Figure 4:
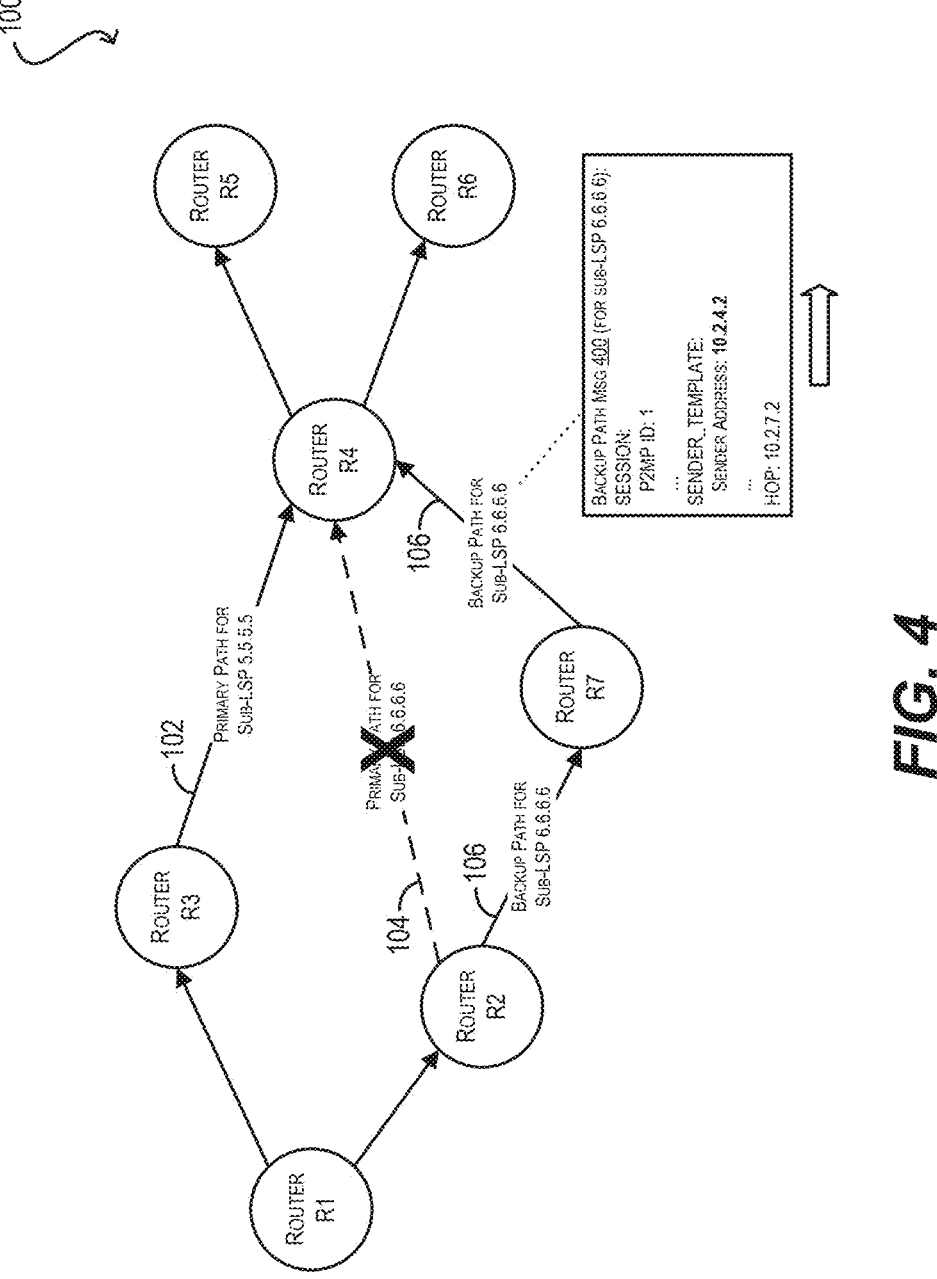
FIG. 4 depicts the application of the workflow of FIG. 3 to the MPLS network scenario of FIG. 1B according to certain embodiments of the present disclosure.

FIG. 4 illustrates the application of this solution to the scenario depicted in FIG. 1B (i.e., a scenario where primary path link 104 for sub-LSP 6.6.6.6 has failed, thereby causing router R2 to failover RSVP signaling for sub-LSP 6.6.6.6 to the backup path embodied by links 106). As shown in FIG. 4, router R2 (which is the PLR for the link failure) transmits a backup Path message 400 over the backup path to router R4 (i.e., the MP) that includes a modified SENDER_TEM-PLATE object identifying the outgoing interface IP address of R4 on the primary path (i.e., 10.2.4.2) as the sender address, rather than the outgoing interface IP address of R4 on the backup path (i.e., 10.2.7.2) as per conventional backup Path message 112 of FIG. 1B. Accordingly, this enables router R4 to uniquely identify router R2 as the PLR that transmitted backup Path message 400.

5. Solution to MP Identification

To solve the problem of correcting identifying the MP that transmitted a backup Resv message, in certain embodiments the PLR can implement two strategies. The first strategy involves associating, by the PLR, the backup interface IP addresses of each of its downstream neighbor routers with the primary interface IP address of each of those routers. In this context, "backup interface IP address" refers to the outgoing interface IP address of a downstream neighbor router on the backup path between that router and the PLR, and "primary interface IP address" refers to the outgoing interface IP address of a downstream neighbor router on the primary path between that router and the PLR. Both of these pieces of information are known to the PLR prior to any failure.

Then, when a failure occurs and the PLR receives a backup Resv message, the PLR can extract the IP address identified in the HOP object of the message (which will be the backup interface IP address of the MP that transmitted the backup Resv message) and can identify the primary interface IP address that is associated with that extracted address, thereby enabling the PLR to uniquely identify the MP that sent the message. This strategy will work in all network topologies except for the one mentioned in section 3.2 above where two neighbor routers are connected via separate primary path links and a single backup path. In this type of topology, the IP address specified in the HOP object of the backup Resv message will map to two (or more) primary interface IP addresses, and thus the PLR will not be able to distinguish among them.

To address this, the second strategy involves examining by the PLR the FILTER_SPEC object in the backup Resv message, under the assumption that the solution to the first problem discussed above is in place. The FILTER_SPEC object mirrors the SENDER_TEMPLATE object in the backup Path message sent by the PLR over the backup path; accordingly, if the solution to the first problem is implemented, the FILTER_SPEC object will identify the PLR's outgoing interface IP address on the failed primary path link. This means that the PLR can use this information, in conjunction with the MP backup interface IP address in the HOP object, to uniquely identify the MP that transmitted the backup Resv message.

Figure 5A:
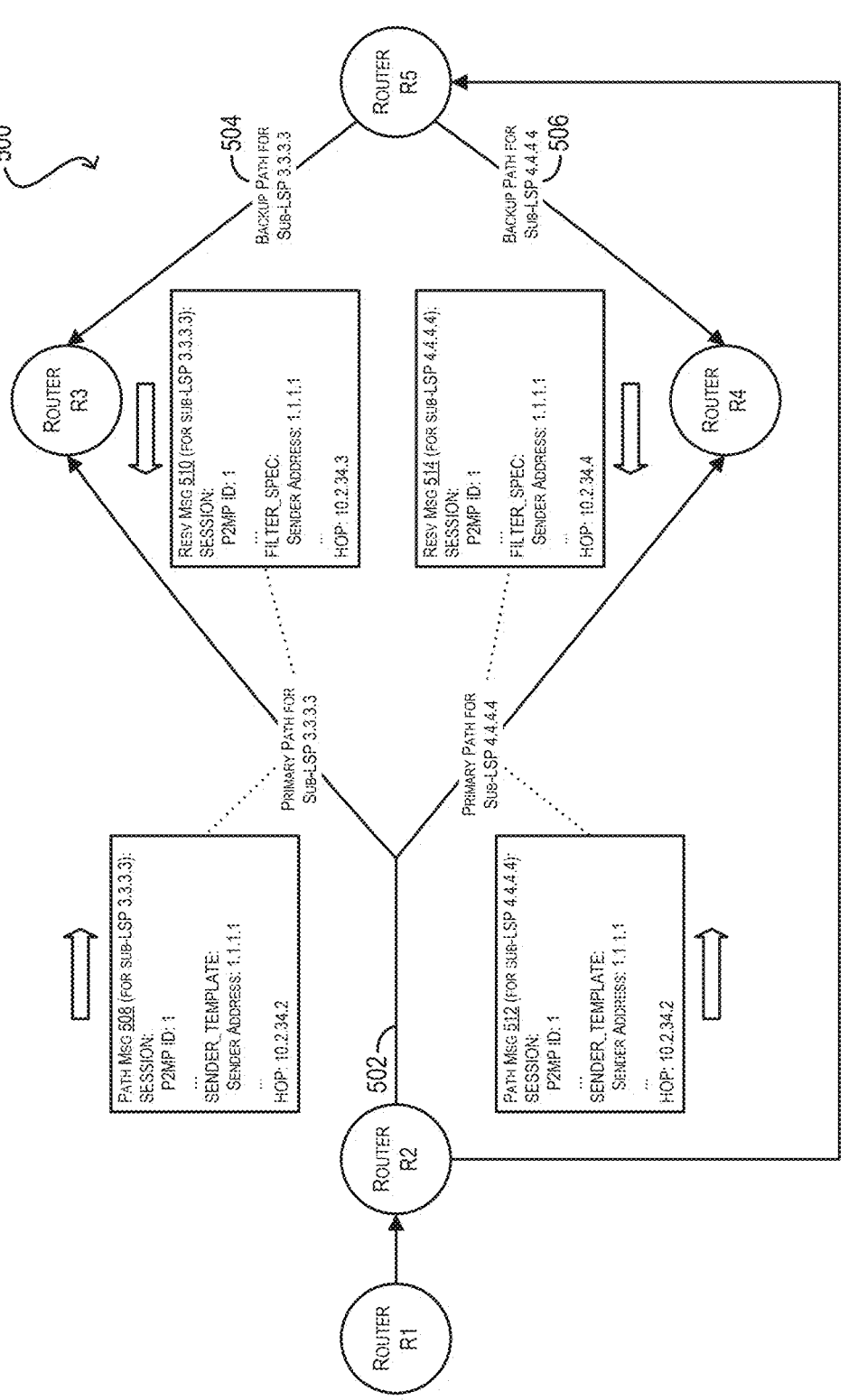
FIGS. 5A and 5B depict scenarios involving yet another example MPLS network according to certain embodiments of the present disclosure.
Figure 5B:
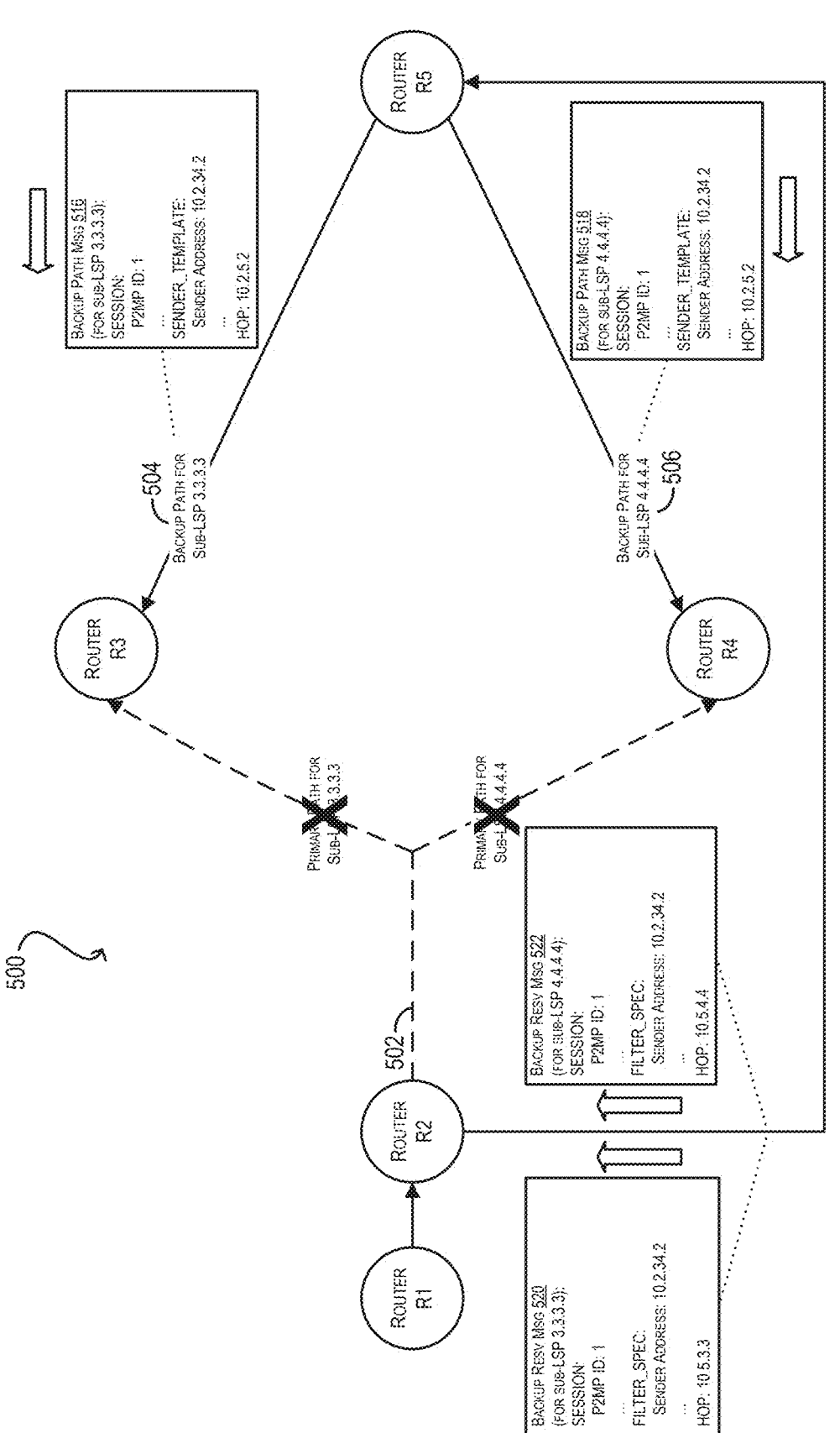

It should be noted that it is not sufficient to implement the second strategy alone, as there are certain other network topologies where the second strategy fails to uniquely identify the MP (e.g., a topology where the PLR reaches multiple downstream neighbor routers through a single interface). Accordingly, both strategies are needed to completely solve this problem. To illustrate this, FIGS. 5A and 5B depict an example MPLS network 500 comprising five routers R1-R5, where a P2MP LSP 1 has been established via multicast RSVP between ingress router R1 and two egress routers R3 and R4, and where two sub-LSPs are signaled within a single signaling sub-group for P2MP LSP 1—namely, a first sub-LSP leading to egress router R3 (denoted as "sub-LSP 3.3.3.3") and a second sub-LSP leading to egress router R4 (denoted as "sub-LSP 4.4.4.4"). In this example, router R2 is coupled to routers R3 and R4 via a one-to-many link 502 which connects to interface IP address 10.2.34.2 on the side of R2 and to interface IP addresses 10.2.34.3 and 10.2.34.4 on the sides of R3 and R4 respectively. Link 502 serves as a primary path link for both sub-LSPs 3.3.3.3 and 4.4.4.4. In addition, sub-LSP 3.3.3.3 has a backup path 504 between routers R2 and R3 that passes through router R5, and sub-LSP 4.4.4.4 has a backup path 506 between R2 and R4 that passes through R5.

FIG. 5A depicts a state of MPLS network 500 where link 502 is operational. Accordingly, router R2 sends a Path message 508 to router R3 over link 502 for sub-LSP 3.3.3.3 that includes a SESSION object identifying the RSVP session to which P2MP LSP 1 belongs, a SENDER_TEM- PLATE object identifying the router ID of ingress router R1 as the sender address, and a HOP object identifying the outgoing interface IP address of router R2 on link 502 (i.e., 10.2.34.2) as the message's previous hop. In response, router R3 sends a Resv message 510 to router R2 over link 502 that includes a SESSION object identifying the RSVP session to which P2MP LSP 1 belongs, a FILTER_SPEC object mirroring the SENDER_TEMPLATE object of Path message 508, and a HOP object identifying the outgoing interface IP address of router R3 on link 502 (i.e., 10.2.34.3).

Similarly, router R2 sends a Path message 512 to router R4 over link 502 for sub-LSP 4.4.4.4 that includes a SESSION object identifying the RSVP session to which P2MP LSP 1 belongs, a SENDER_TEMPLATE object identifying the router ID of ingress router R1 as the sender, and a HOP object identifying the outgoing interface IP address of router R2 on link 502 (i.e., 10.2.34.2) as the message's previous hop. In response, router R4 sends a Resv message 514 to router R2 over link 504 that includes a SESSION object identifying the RSVP session to which P2MP LSP 1 belongs, a FILTER_SPEC object mirroring the SENDER_TEM-PLATE object of Path message 512, and a HOP object identifying the outgoing interface IP address of router R4 on link 504 (i.e., 10.2.34.4).

FIG. 5B depicts a state of MPLS network 500 where link 502 has failed, thereby causing router R2 to failover signaling for sub-LSP 3.3.3.3 to backup path 504 and failover signaling for sub-LSP 4.4.4.4 to backup path 506. In this scenario, router R2 is the PLR and transmits two backup Path messages: a first backup Path message 516 to router R3 for sub-LSP 3.3.3.3 that includes the same SESSION object as original Path message 508, a modified SENDER_TEM-PLATE object identifying the outgoing interface IP address of R2 towards the primary path (i.e., 10.2.34.2) as the sender address (in accordance with the solution to the first problem mentioned above), and a modified HOP object identifying the outgoing interface IP address of R2 towards backup path 504 (i.e., 10.2.5.2) as the message's previous hop; and a second backup Path message 518 for sub-LSP 4.4.4.4 that includes the same SESSION object as original Path message 510, a modified SENDER_TEMPLATE object identifying the outgoing interface IP address of R2 towards the primary path (i.e., 10.2.34.2) as the sender address (in accordance with the solution to the first problem mentioned above), and a modified HOP object identifying the outgoing interface IP address of R2 towards backup path 506 (i.e., 10.2.5.2) as the message's previous hop.

In response, router R3 transmits a backup Resv message 520 for sub-LSP 3.3.3.3 to router R2 that includes the same SESSION object as Resv message 510, a FILTER_SPEC object mirroring the SENDER_TEMPLATE object of backup Path message 516 (and thus identifying address 10.2.34.2 as the sender address), and a HOP object identifying the outgoing interface IP address of R3 on backup path 504 (i.e., 10.5.3.3) as the message's previous hop. Further, router R4 transmits a backup Resv message 522 for sub-LSP 4.4.4.4 to router R2 that includes the same SESSION object as Resv message 514, a FILTER_SPEC object mirroring the SENDER_TEMPLATE object of backup Path message 518 (and thus identifying address 10.2.34.2 as the sender address), and a HOP object identifying the outgoing interface IP address of R4 on backup path 506 (i.e., 10.5.4.4) as the message's previous hop.

In this scenario, because the FILTER_SPEC objects in backup Resv messages 520 and 522 include the same sender address 10.2.34.2, router R2 cannot rely on this information alone to uniquely identify the MP that sent each message.

However, as mentioned previously, router R2 can extract the IP addresses included in the HOP objects of these backup Resv messages (which identify the backup interface IP addresses of the MPs that sent the messages) and can determine the primary interface IP address associated with each backup interface IP address, thereby uniquely identifying the MP using the primary interface IP address. For example, with respect to backup Resv message 520, router R2 can extract IP address 10.5.3.3 from the message's HOP object and determine that this address is associated with primary interface IP address 10.2.34.3 (which is where R2 sent backup Path message 516), thereby identifying router R3 as the originator of message 520. Similarly, with respect to backup Resv message 522, router R2 can extract IP address 10.5.4.4 from the message's HOP object and determine that this address is associated with primary interface IP address 10.2.34.4 (which is where R2 sent backup Path message 518), thereby identifying router R4 as the originator of message 522.

Figure 6:
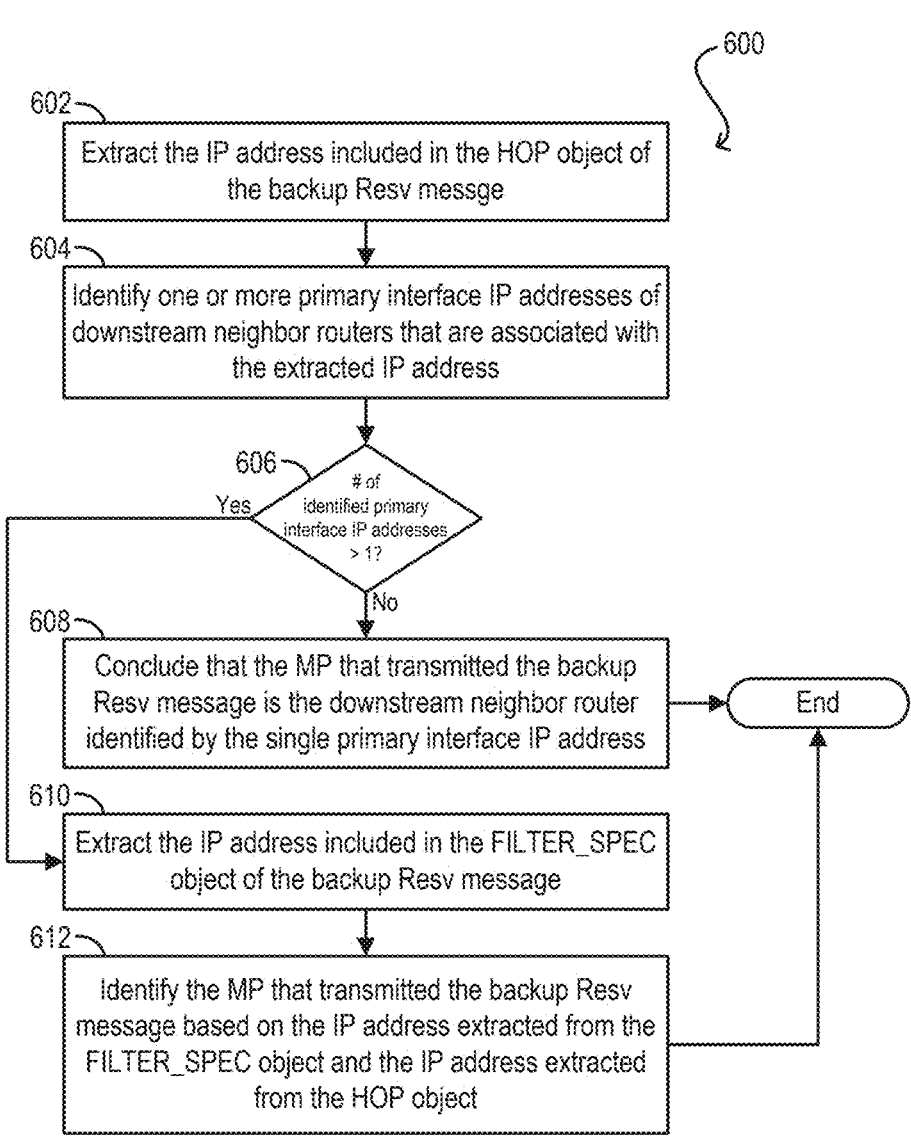
FIG. 6 depicts a workflow for identifying a Merge Point (MP) that transmitted a backup RSVP Resv message according to certain embodiments of the present disclosure.

FIG. 6 depicts a workflow 600 that may be executed by the network router (PLR) of workflow 300 for implementing the foregoing solution according to certain embodiments. In particular, workflow 600 presents steps performed by the router upon receiving a backup Resv message on the backup path (or on an alternate path between the MP and the PLR). Like workflow 300, workflow 600 may be embodied in software that runs on one or more general-purpose processors of the router, such as an OS that runs on a CPU that is part of the router's management/control plane. Alternatively, workflow 600 may be embodied in hardware, such as an ASIC or FPGA that is part of the router's data plane.

Starting with step 602, the router can extract the IP address included in the HOP object of the backup Resv message, which corresponds to the backup interface IP address of the MP that transmitted the message.

At steps 604 and 606, the router can identify one or more primary interface IP addresses of downstream neighbor routers that are associated with the extracted IP address and can check whether the number of identified primary interface IP addresses is greater than one.

If the answer at step 606 is no (which means only a single primary interface IP address was found to be associated with the extracted IP address), the router can conclude that the MP that transmitted the backup Resv message is the downstream neighbor router identified by that single primary interface IP address (step 608) and the workflow can end.

On the other hand, if the answer at step 606 is yes (which means multiple primary IP interface IP addresses were found to be associated with the extracted IP address), the router can extract the IP address included in the FILTER_SPEC object of the backup Resv message, which corresponds to the outgoing interface IP address of the router on the primary path (step 610). Finally, the router can identify the MP that transmitted the backup Resv message based on the IP address extracted from the FILTER_SPEC object and the IP address extracted from the HOP object (step 612).

Figure 7:
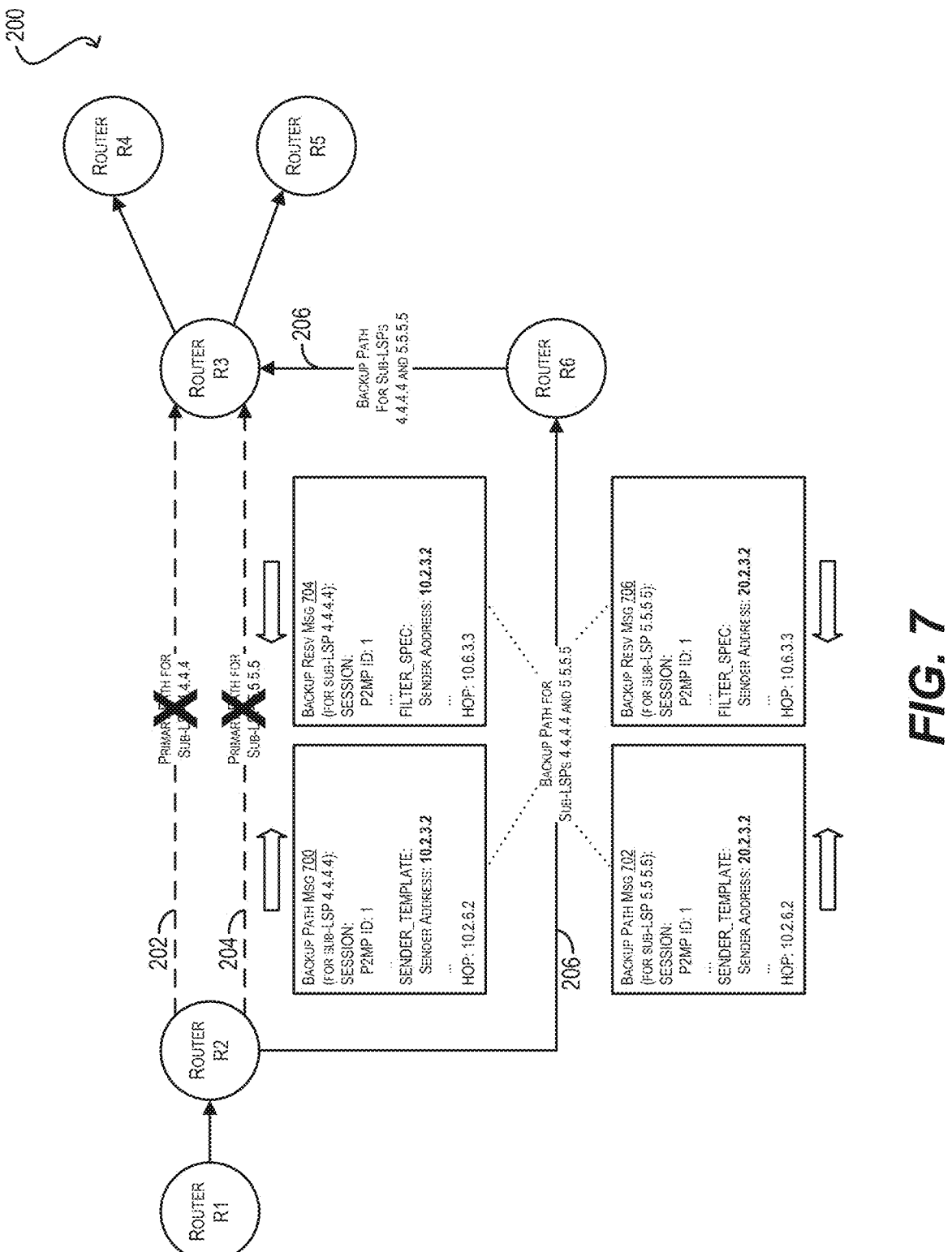
FIG. 7 depicts the application of the workflow of FIG. 6 to the MPLS network scenario of FIG. 2B according to certain embodiments of the present disclosure.

FIG. 7 illustrates the application of this solution to the scenario depicted in FIG. 2B (i.e., a scenario where both primary path links 202 and 204 between routers R2 and R3 have failed, thereby causing router R2 to failover signaling for sub-LSP 4.4.4.4 and sub-LSP 5.5.5.5 to the singular backup path embodied by links 206). As shown in FIG. 7, router R2 (which is the PLR for the link failure) transmits backup Path messages 700 and 702 over the backup path to router R3 that include modified SENDER_TEMPLATE objects identifying the outgoing interface IP addresses of R2 on primary path links 202 and 204 respectively (i.e., addresses 10.2.3.2 and 20.2.3.2), rather than the outgoing interface IP addresses of R2 on the backup path (i.e., 10.2.6.2) as per conventional backup Path messages 216 and 218 of FIG. 2B.

This in turn causes router R3 to transmit backup Resv messages 704 and 706 over the backup path to router R2 that include FILTER_SPEC objects which mirror the received SENDER_TEMPLATE objects, and thus identify addresses 10.2.3.2 and 20.2.3.2. Upon receiving these messages, router R2 can uniquely identify interface IP address 10.2.3.3 of router R3 as the MP that transmitted backup Resv message 704 (by virtue of the FILTER_SPEC and HOP objects included in message 704) and also uniquely identify interface IP address 20.2.3.3 of router R3 as the MP that transmitted backup Resv message 706 (by virtue of the FILTER_SPEC and HOP objects included in message 706).

6. Example Network Router

Figure 8:
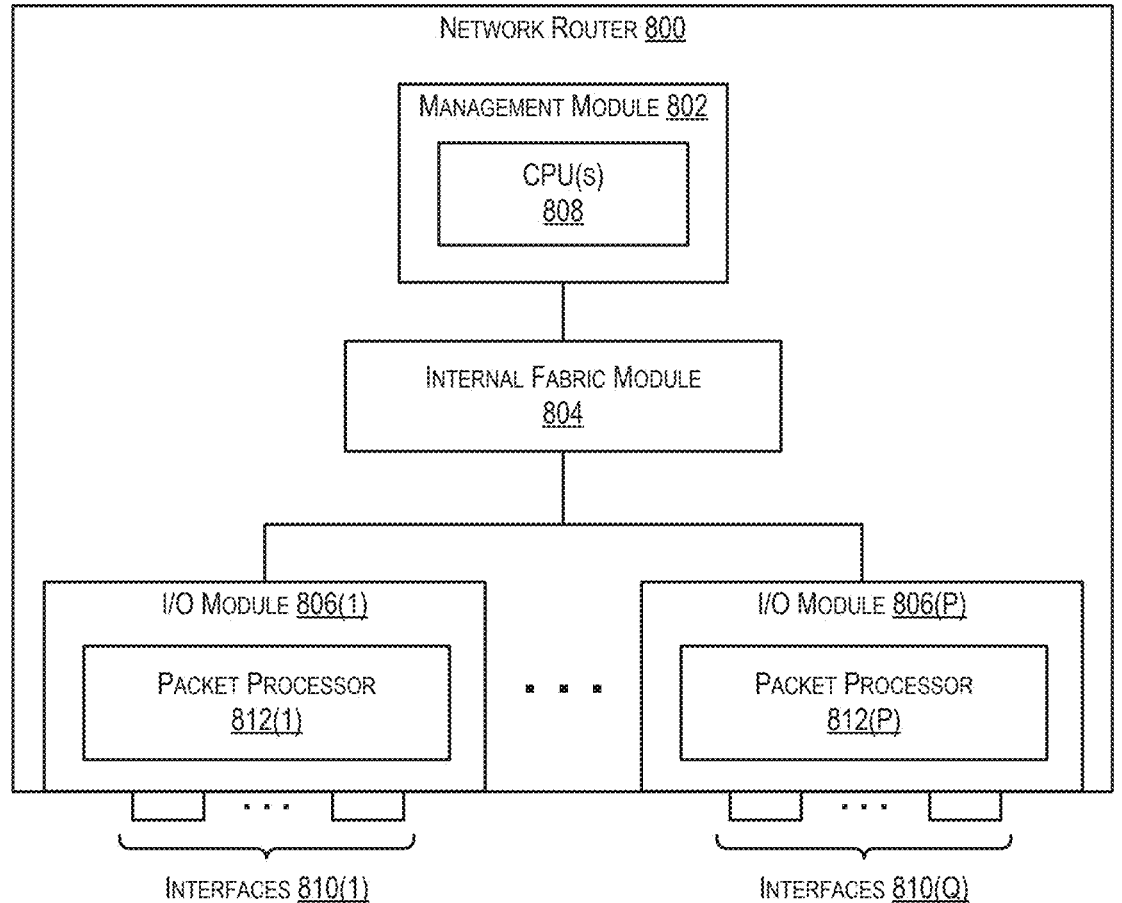
FIG. 8 depicts an example network router according to certain embodiments of the present disclosure.

FIG. 8 is a simplified block diagram of a network router 800 according to certain embodiments of the present disclosure. As shown, network router 800 comprises a management module 802, an internal fabric module 804, and a number of I/O modules 806(1)-(P). Management module 802 includes one or more CPUs 808 for managing/controlling the operation of router 800. Each CPU 808 may be a general-purpose processor, such as an Intel/AMD x86 or ARM-based processor, that operates under the control of software stored in an associated memory (not shown). Such software may implement some or all of the techniques described in the foregoing disclosure.

Internal fabric module 804 and I/O modules 806(1)-(P) collectively represent the data, or forwarding, plane of network router 800. Internal fabric module 804 is configured to interconnect the various other modules of network router 800. Each I/O module 806 includes one or more input/output interfaces (ports) 810(1)-(Q) that are used by network router 800 to send and receive network packets. Each I/O module 806(1)-(P) also includes a packet processor 812, which is a specialized processor (e.g., an ASIC or FPGA) that is designed to make line speed decisions on how to handle incoming or outgoing network packets. In some embodiments, packet processor 812 may implement some or all of the techniques described in the foregoing disclosure.

It should be appreciated that network router 800 is illustrative and many other configurations having more or fewer components than router 800 are possible.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network router that implements Resource Reservation Protocol (RSVP), the method comprising:

detecting a failure on a link to a downstream neighbor router, wherein the link is part of a primary path that is signaled using RSVP, and wherein the link is associated with a backup path;

determining that a backup RSVP Path message should be signaled to the downstream neighbor router;

creating the backup RSVP Path message, such that the backup RSVP Path message includes an outgoing interface Internet Protocol (IP) address of the network router on the primary path in a SENDER_TEMPLATE object and an outgoing interface IP address of the network router on the backup path in a HOP object; and transmitting the created backup RSVP Path message.

2. The method of claim 1 wherein the backup path is precomputed by the network router using RSVP fast reroute.

3. The method of claim 1 wherein the primary path is a sub-LSP (label switched path) that is signaled with one or more other sub-LSPs via a single multicast RSVP signaling sub-group.

4. The method of claim 1 wherein the downstream neighbor router has a plurality of upstream neighbor routers, and wherein the plurality of upstream neighbor routers include the network router.

5. The method of claim 4 wherein upon receiving the backup RSVP Path message, the downstream neighbor router uniquely identifies, from among the plurality of upstream neighbor routers, the network router as a Point of Local Repair (PLR) that transmitted the backup RSVP Path message.

6. The method of claim 5 wherein the downstream neighbor router uniquely identifies the network router based on the outgoing interface IP address of the network router on the primary path included in the SENDER_TEMPLATE object.

7. The method of claim 1 wherein the network router has a plurality of downstream neighbor routers.

8. The method of claim 7 further comprising:

receiving a backup RSVP Resv message;

extracting a first IP address included in a HOP object of the backup RSVP Resv message; and identifying one or more primary interface IP addresses of one or more downstream neighbor routers in the plurality of downstream neighbor routers that are associated with the first IP address.

9. The method of claim 8 further comprising, upon identifying exactly one primary interface IP address that is associated with the first IP address, the exactly one primary interface IP address belonging to a first downstream neighbor router:

identifying the first downstream neighbor router as a Merge Point (MP) that transmitted the backup RSVP Resv message.

10. The method of claim 8 further comprising, upon identifying multiple primary interface IP addresses that are associated with the first IP address:

extracting a second IP address included in a FILTER_SPEC object of the backup RSVP Resv message; and identifying an MP that transmitted the backup RSVP Resv message based on the first IP address and the second IP address.

11. A network router that implements Resource Reservation Protocol (RSVP), the network router comprising:

one or more processors; and a computer-readable storage medium having stored thereon program code that, when executed by the one or more processors, causes the one or more processors to:

detect a failure on a link to a downstream neighbor router, wherein the link is part of a primary path that is signaled using RSVP, and wherein the link is associated with a backup path;

determine that a backup RSVP Path message should be signaled to the downstream neighbor router;

create the backup RSVP Path message, such that the backup RSVP Path message includes an outgoing interface Internet Protocol (IP) address of the network router on the primary path in a SENDER_TEMPLATE object and an outgoing interface IP address of the network router on the backup path in a HOP object; and transmit the created backup RSVP Path message.

12. The network router of claim 11 wherein the primary path is a sub-LSP (label switched path) that is signaled with one or more other sub-LSPs via a single multicast RSVP signaling sub-group.

13. The network router of claim 11 wherein the downstream neighbor router has a plurality of upstream neighbor routers, and wherein the plurality of upstream neighbor routers include the network router.

14. The network router of claim 13 wherein upon receiving the backup RSVP Path message, the downstream neighbor router uniquely identifies, from among the plurality of upstream neighbor routers, the network router as a Point of Local Repair (PLR) that transmitted the backup RSVP Path message.

15. The network router of claim 14 wherein the downstream neighbor router uniquely identifies the network router based on the outgoing interface IP address of the network router on the primary path included in the SENDER_TEMPLATE object.

16. The network router of claim 11 wherein the network router has a plurality of downstream neighbor routers.

17. The network router of claim 16 wherein the program code further causes the one or more processors to:

receive a backup RSVP Resv message;

extract a first IP address included in a HOP object of the backup RSVP Resv message; and identify one or more primary interface IP addresses of one or more downstream neighbor routers in the plurality of downstream neighbor routers that are associated with the first IP address.

18. The network router of claim 17 wherein the program code further causes the one or more processors to, upon identifying exactly one primary interface IP address that is associated with the first IP address, the exactly one primary interface IP address belonging to a first downstream neighbor router:

identify the first downstream neighbor router as a Merge Point (MP) that transmitted the backup RSVP Resv message.

19. The network router of claim 17 wherein the program code further causes the one or more processors to, upon identifying multiple primary interface IP addresses that are associated with the first IP address:

extract a second IP address included in a FILTER_SPEC object of the backup RSVP Resv message; and identify an MP that transmitted the backup RSVP Resv message based on the first IP address and the second IP address.

20. A method performed by a network router that implements Resource Reservation Protocol (RSVP), the method comprising:

detecting a failure on a link to a downstream neighbor router, wherein the link is part of a primary path that is signaled using RSVP, and wherein the link is associated with a backup path;

creating a backup RSVP Path message that includes an outgoing interface Internet Protocol (IP) address of the network router on the primary path; and transmitting the created backup RSVP Path message.

* * * * *